United States Patent

[11] 3,578,117

| [72] | Inventor | Karl Gustav Ahlen<br>Stockholm Sweden |
|---|---|---|
| [21] | Appl. No. | 781,855 |
| [22] | Filed | Dec. 6, 1968 |
| [45] | Patented | May 11, 1971 |
| [73] | Assignee | S. R. M. Hydromekanik<br>AB, Sweden |
| [32] | Priority | Dec. 11, 1967 |
| [33] | | Great Britain |
| [31] | | 56293/67 |

[54] VEHICLE TRANSMISSIONS
23 Claims, 6 Drawing Figs.

[52] U.S. Cl. ........................................... 192/3.5,
74/740, 74/688
[51] Int. Cl. .................................................. F16h 37/00,
F16h 47/08, F16h 67/00
[50] Field of Search............................................ 74/740;
192/3.5

[56] References Cited
UNITED STATES PATENTS

| 2,328,261 | 8/1943 | Cory............................. | 74/740 |
| 2,699,689 | 1/1955 | Ahlen........................... | 74/740 |
| 3,065,643 | 11/1962 | Mark et al. .................. | 74/740 |
| 3,108,667 | 10/1963 | Kelley ........................... | 74/688X |

FOREIGN PATENTS

| 887,456 | 8/1953 | Germany...................... | 74/740 |

*Primary Examiner*—Arthur T. McKeon
*Attorney*—Larson, Taylor & Hinds

ABSTRACT: A transmission for vehicles including a hydrodynamic torque converter wherein the torque multiplication range of the torque converter is increased by a power shift gear device having a release clutch interposed between input and output of the shift gear. The output side of the shift gear is connected to a synchromesh gear transmission, the arrangement being such that the shift gear the release clutch and the synchromesh gear can be connected in series.

VEHICLE TRANSMISSIONS

This invention relates to power transmission for road vehicles and particularly to hydromechanical automatic transmissions having a high torque ratio.

The problem of developing an automatic transmission suitable for on-the-road trucks and tractive units has confronted the people concerned for a considerable time but, the transmissions so far developed for this purpose have not given sufficiently good results to make them acceptable insofar, for example, that the fuel consumptions obtained have been unfavorable when compared with the fuel consumption obtained using well tried manually controlled transmissions. In addition the automatic transmissions have not been sufficiently adaptable for fitting in existing trucks and tractive units, the total torque ratio has been too low and servicing very complicated. It has generally been considered that in order to produce a satisfactory automatic transmission, solutions must be found to problems associated with power shifts, complete automation of the transmission and the production of a transmission having a tractive effort curve which, throughout the working range, compares favorably with that obtained using a manually selected gearbox under balanced conditions. However, factors which have not been considered sufficiently fully hitherto are those influencing fuel consumption, complication, adaptability, weight and size of such transmissions. To this end it has not been appreciated that, in one particular range, power shift may be necessary whereas, in another range power shift may be of little importance. The weight question is also important and insufficient consideration has been given to this question.

Our investigations have shown that, ideally, hydromechanical automatic transmissions should have as few mechanical parts as possible in order to reduce both size and weight and this, especially at a time when the power of the engines in the vehicles is constantly increasing.

The present invention aims to solve these problems and seeks to provide an automatic hydromechanical transmission for transmitting high horsepower with small dimensions; relatively low weight; improved fuel consumption; complete automation over the whole operational range and, where necessary, power shift without braking the drive line. The present invention also seeks to provide an automatic transmission which can be adapted to meet the requirements of different vehicles, for example, to meet the requirement of total gear ratio in relation to horsepower per ton with a certain maximum speed for a particular field of operation within a wide range and with minimum modification of the transmission per se, for example, by using standard adapter gears. The present invention also presents a solution to problems associated with the automation of a transmission comprising a combination of a hydrodynamic torque converter with a mechanical gear, for instance of the layshaft type.

It is already well known from experience in the passenger car transmission field that, under certain circumstances, it is desirable for a transmission comprising a hydrodynamic torque converter and a series of gear steps to include a facility permitting the transmission to be locked in either a low or a high gear, depending on the road conditions. Thus, for example, on icy roads a gear may be selected so as to avoid too high a stall torque ratio and, on especially on steep downhill so-called serpentine roads, the top speed of a vehicle may be limited accordingly. Moreover, for safe driving and for lower fuel consumption it is considered important that the whole speed range for normal driving conditions should be automatic thereby enabling the driver to concentrate entirely upon controlling the steering wheel, the throttle and the brake. Such facilities are valuable to an even greater extent on a heavy road truck and are obtainable from a transmission in accordance with the present invention which comprises a hydrodynamic torque converter, a power shift gear arrangement for increasing the torque multiplication range of the torque converter, a release clutch between the input and the output of the power shift gear arrangement, and a synchromesh gear transmission connected to the output of the power shift gear arrangement.

A high stall torque ratio transmission in accordance with this invention may include the SRM DS type transmission together with a release clutch and a layshaft gear having two or three forward speeds and preferably including a reverse gear. Alternatively an SRM D type transmission and planetary, two-speed power shift gear including release possibilities and a layshaft gear including a reverse may be used. It will be appreciated that the transmission of the invention is neither a power shift transmission in combination with a hydraulic torque converter nor simply a synchromesh transmission in combination with a hydraulic torque converter. Further the transmission of the invention omits certain features which have hitherto been considered essential. Thus by omitting, in some ranges the requirement of a "full power shift transmission" or the "requirement of the simple transmission with only synchromesh gears" in combination with the torque converter, the aims described above can be obtained. In reality although the features omitted in particular ranges, are of relatively minor importance, the advantages gained thereby are very good fuel consumption FIGS., excellent adaptability, reasonable complication, power shift where necessary, small size and low weight. Thus the features omitted include power shift in the range where power shift is not necessary and the use of power shift instead of synchromesh shifts for shifts between those gears where braking the drive line leaves much to be desired. The solution according to the invention thus opens a new field for the automatic transmission. The SRM type transmissions are particularly useful for the present invention since for a heavy vehicle travelling at low speeds, the shift must, for a high quality solution, be of the power shift type and, if possible, without any brake in the drive line. Braking the drive line is of course less important at high speeds where the time during which the driving torque is interrupted can be considerably longer without causing any substantial change in the speed of the vehicle.

In addition to the problems outlined, there must be a part of the transmission rendering the transmission adaptable to meet the requirements of different vehicles and different fields of operation without any appreciable increase in costs. Thus the total torque ratio demanded by the considerations of horsepower/weight ratio and top speed combinations for different on-the-road trucks, tractors, trailer trains, or even the requirement of a fuel-saving overdrive type ratio letting the engine run at higher torque and lower speed for a particular vehicle road speed can be obtained.

The combinations outlined above using the special type of release clutch described in U.S. Pat. application Ser. 754,788, filed Aug. 23,1968 which gives a sufficiently fast release and a sufficiently soft pickup of torque is particularly useful in connection with the combination of the SRM DS type of transmission with a release clutch and a layshaft two or three-speed gear.

The combination of a mechanical gear and a hydrodynamic torque converter for the above purposes cannot however be made fully automatic without solving problems in connection with the automatic shift of say two-speed gear and its overruling device for locking up a gear when required. A transmission in accordance with this invention and as outlined above presents a solution to these problems rendering possible the use of the SRM DS type transmission (described in British Pat. Nos. 700,443; 722,194; 697,088 and 712,231) in combination with a special type of release clutch (described in U.S. Pat. application Ser. No. 754,788, filed Aug. 23, 1968 and a layshaft gear of principally conventional design as elements of the transmission according to the invention.

The SRM DS transmission also has the advantage of possessing excellent hydrodynamic braking applicable in a low field suitable for use going downhill on for instance serpentine roads and a high field suitable for reducing the speed of the vehicle during normal driving. This facility of hydrodynamic braking, apart from being useful for all road vehicles, is particularly useful for tractor-trailer combinations which are susceptible to so-called "jackknifing" if the braking of the trailer is lower than the braking on the front wheels of the traction unit or truck or, if the wheels of the traction unit lock.

The invention will now be described by way of example with reference to the accompanying drawings in which.

Figure 1:
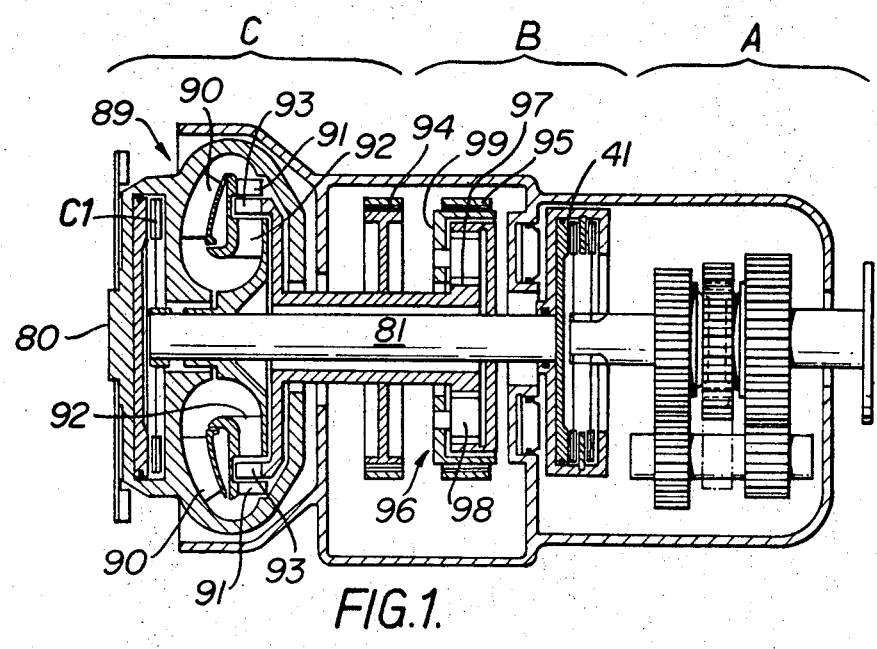
FIG. 1 shows diagrammatically a transmission of the invention comprising an SRM DS type transmission, a release clutch and a layshaft gear.
Figure 2:
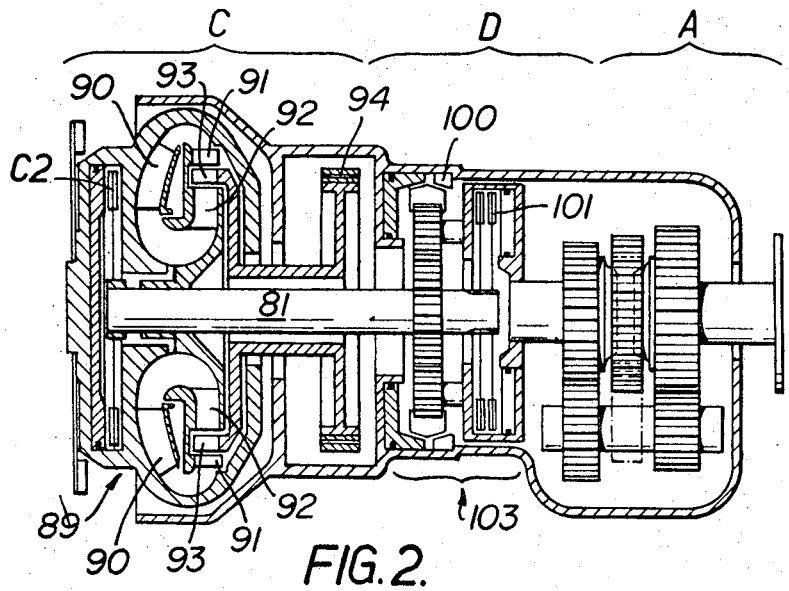
FIG. 2 shows diagrammatically a transmission of the invention comprising an SRM D type transmission, a power shift gear with release possibility and a layshaft gear.

The Table appended at the end of the specification shows speed responsible losses for the arrangement according to the invention, according to FIGS. 1 and 2, as well as the same kind of losses for a hydrodynamic transmission with a lockup clutch combined with a four-speed power shift planet gear transmission. The table shows also FIGS. for normal average load of the kind of transmission in question and the influence of fuel consumption of the above load of losses for an average load of 20 percent accepted as a norm, and, further it shows the conclusions to be taken from the mentioned FIGS. about the difference in fuel consumption to be expected for the two transmission systems in question.

FIG. 1 shows, schematically, a single rotation torque converter C fitted with lockup clutch C1, for providing a direct connection from input 80 of the torque converter 89 to the output shaft 81 thereof, a so-called double rotation arrangement, power shift arrangement B which includes secondary side release clutch 41 and a two-speed layshaft gear A of the synchromesh type and including reverse gear. By "powershift" is meant a means for changing the mode of operation and hence the speed ratio of the torque converter 89 with friction-type couplings as opposed to a gear or meshing-type coupling. In FIG. 1 this includes a first friction brake 94 operatively connected to control guide vanes 93 and a second friction brake 95 which controls turbine vanes 91 and 92 through planetary gear 96 which includes a sun gear 97, planet gears 98 and a ring gear 99. The special torque converter shown is of the standard SRM D type described in British Pat. Nos. 624,213; 712,213; 677,179 and 699,088 and modified for the so-called double rotation action, described in British Pat. Nos. 789,628; 722,194; 712,290 and 700,443. As shown in the said patents, this type of torque converter 89 includes a row of pump vanes 90, two rows of turbine vanes 91 and 92 and a row of guide vanes 93. The secondary side release clutch may be of a small secondary shaft mass such as that described in U.S. Pat. application Ser. No. 754,788, filed Aug. 23, 1968. The gear A may be a conventional type two- or three-speed synchromesh gear with reverse.

FIGURE 2 shows a torque converter C with lockup clutch C2 similar to C1 in FIGURE 1, a two-speed power shift gear D of a type which disconnects primary and secondary drive shafts when one of the gear ranges is not directly engaged, and a conventional type of two- or three-speed synchromesh transmission A, including a reverse gear.

In FIGURE 2, the power shift includes a first friction brake 94 similar to the brake 94 in FIG. 1, and also friction brake elements 101 and 102 in the combined planetary gear and release clutch arrangement 103. That is, in one mode (as illustrated in FIG. 2) it releases the torque converter 89 from the synchromesh transmission A while different connections of 100 and 101 provide different modes of operation of torque converter 89 and hence multiply its torque range.

Figure 3:
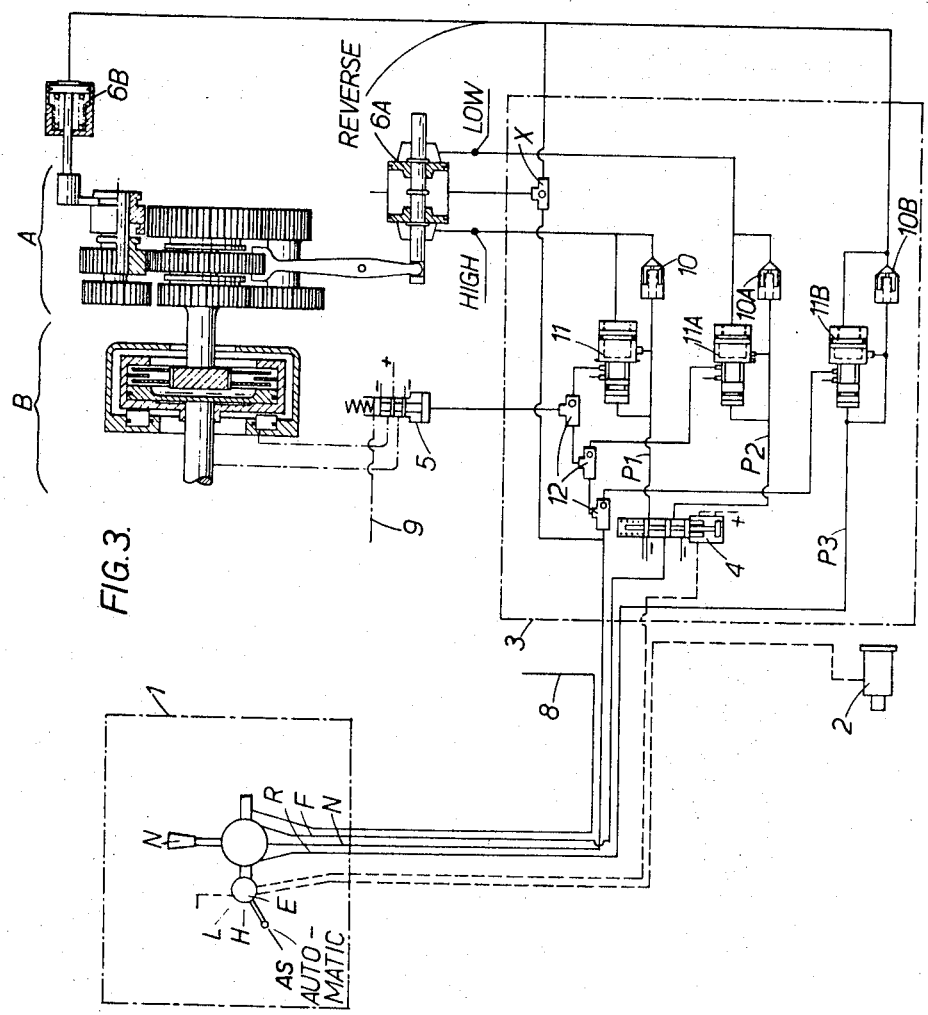
FIG. 3 shows diagrammatically, an arrangement for obtaining automatic shift of the layshaft gear in addition to a remote control and a blocking device for the shift.

FIG. 3 shows, diagrammatically, an arrangement for obtaining automatic shift, remote control and a selection arrangement for overruling the automatic operation of the layshaft gear; the remote control of engagement and disengagement of the clutch B, and engagement and disengagement of the gear A initiated by a first manual selection valve mechanism 1 situated on the steering column. The valve 1 also includes an electrical switch E for selecting automatic shift AS between high H and low L gears of the layshaft gear A. Alternatively, the gear A can be set in high or in low. The valve 1 has a ratchet which is disengaged when the driver depresses the wheel brake pedal. A pipe 8 is connected to the wheel brake system. The gear A is engaged in different ranges by servo motors 6A or 6B. The servo 6A has three positions H,L and reverse R, each connectable with air pressure, and the servo 6B permits engagement of reverse which is normally maintained in a state of release by a spring but is engageable by pressure air. The release clutch B is connected and disconnected by a control valve 5 having two positions, one in which the clutch is engaged and one in which the clutch is released. When the release clutch B is released, the lockup clutch (of the torque converter) C1 (C2) for initiating shift from low to high gear in automatic drive and a centrifugal regulator 2 driven by the output shaft of the transmission is used. This centrifugal regulator 2, when the switch E is set on automatic drive closes a circuit including a electropneumatic selector valve 4. The selector valve 4 is normally maintained by a spring in a position for conveying air to the high gear side of the servo-cylinder 6A. When the electrical circuit is closed by the centrifugal regulator 2, the valve is displaced permitting air to pass to the low-pressure side of the servo-cylinder and the opposite cylinder is released. Pipes P1,P2 connecting the selector valve 4 to each of the high and low gear sides of the servo-cylinders 6A each include one-way restrictions 10 and 10A and associated valves 11 and 11A serving to guarantee that the release clutch valve 5 is rapidly positioned for release. Pipe connection P3 to serve cylinder 6B also includes a one-way restriction 10B and an associated valve 11B. When these pipes are initially supplied with pressure air and also when the pressure air on the secondary side of the restrictions has reached a certain high pressure, the appropriate valve 11, 11A or 11B is returned thereby cutting out the release of the clutch. The valve arrangements 11, 11A, 11B are dimensioned so that the release clutch releases before the pressure in a servomotor has reached too high a value and the time for filling up the servomotor cylinder to the pressure when the valve 11 (11A, 11B) returns to its first position, should be such that it is sufficient for the synchronizers, under pressure from the servomotor, to synchronize. Thus, when the release clutch starts to engage, the clutch will slip in. The valve 5 includes a section by means of which a pipe 9 leading to the torque converter C is vented when the valve 5 is in position for release of the clutch. This pipe 9 is connected to a special direct drive release hold to ensure that when the release clutch is released the direct drive is also released. In order to reach the valve 5, pressure air from the valves 11 11A and 11B passes through one of three three-way valves 12 which block appropriate vent holes when one of the pipes is pressurized. There is also a direct pressure pipe from the forward-neutral-reverse valve 1 which pipe is pressurized when this valve 1 is put in neutral.

Figure 4:
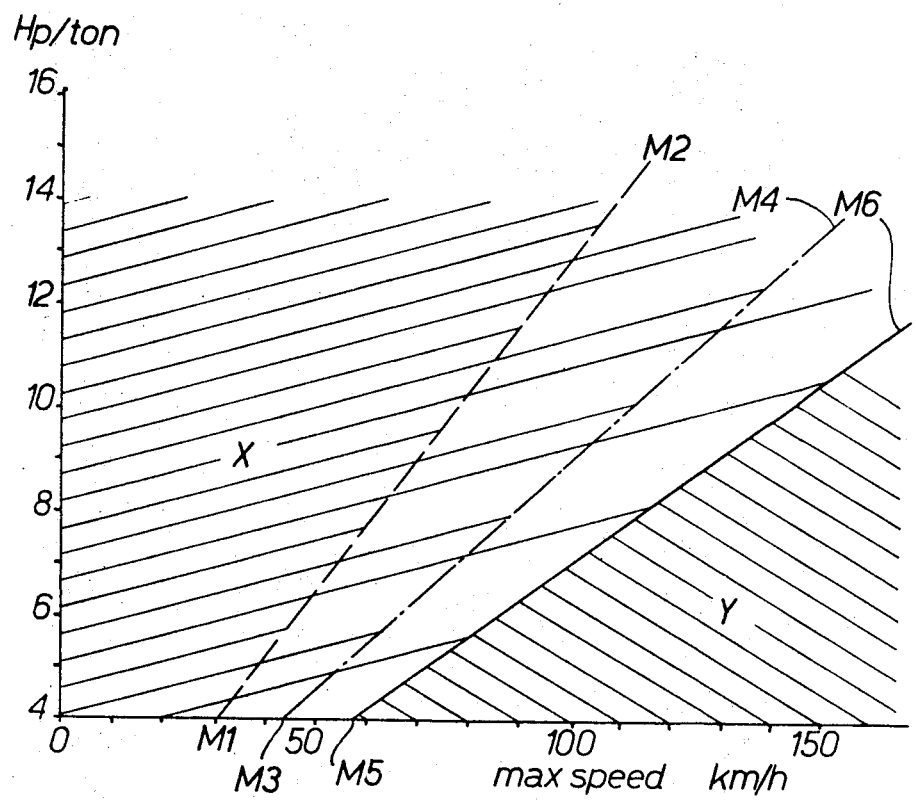
FIG. 4 shows the necessary gear ratios for use with a transmission of the invention in order to obtain lower fuel consumption than that obtained using a mechanical gear.

As mentioned previously, the construction of a transmission in accordance with the invention fulfills the requirement of easy adaptation of the total gear ratio. The reason for this is indicated in FIG. 4 which shows gear ratios necessary for the types of converter in question in order to be equal to or better than known mechanical transmissions. FIG. 4 4 indicates the "HP/ton—max speed" field within which the lower fuel consumption can be expected for an SRM DS transmission (Field X) an SRM DS transmission with two-speed gear (ratio 1.5:1 and 2:1.) in relation to the same vehicle with an eight-speed mechanical transmission (Field Y).

In the graph line M1—M2 represents the limit for an SRM DS transmission ration 9:1; line M3—M4 represents the limit for an SRM DS transmission plus two-speed gear (ratio 1:5:) transmission of total ratio 13.1:1, and line M5—M6 represents the limit for an SRM DS transmission plus two-speed gear (ratio 2:1) total ratio 18:1 1. A comparison was made for the same service during a period of more than 90 working days on eight vehicles, of which four supplied with "SRM DS O, 9 R transmission with a complementary two-speed 1,4 gear ratio gear" and the other four had the standard eight-speed mechanical transmission. The vehicles were used in pairs in different places in Sweden for the same service and during a 2-year period, mileage and fuel consumption were registered. For the same average speed the results show a saving for trucks having the SRM transmission of lowest 7 percent and highest 10 percent The difference being due to the topography of the districts. The graphs of FIG. 4 are applicable independently of how well the gear steps in the mechanical transmission are selected. The graphs are also applicable for all cases except where the mechanical gear has an overdrive unit necessitating an overdrive speed for the unit according to the invention. The result of the transmission according to the invention is that for the first time with a hydrodynamic transmission, fuel saving in relation to a mechanical transmission can be obtained. The reason for this will be further demonstrated later with reference to the Table.

From time to time horsepower per ton in a vehicle of the type in question is increased and there is also a tendency for the top speed of the vehicle to be increased. The transmission according to the invention is easily adaptable for different total gear ratios simply by changing a set of gears of the layshaft gear.

Figure 5:
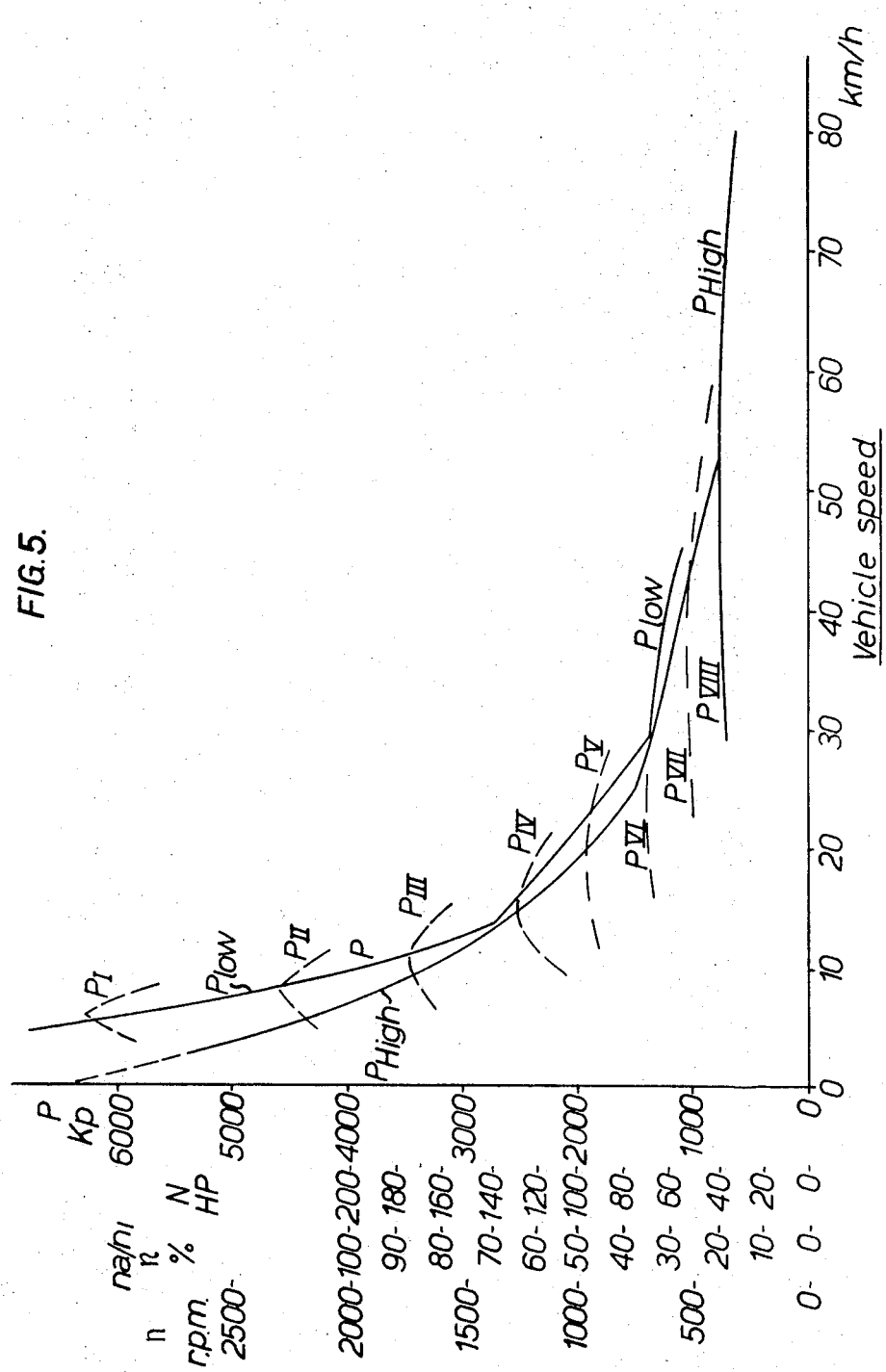
FIG. 5 shows the tractive effort relationships under static conditions.

FIG. 5 shows a diagram of tractive effort P against vehicle speed comparing a mechanical transmission with a hydrodynamic transmission, which comparison due to the fact that dynamic conditions have not been taken into consideration, leads to faulty conclusions. For example, in low speed, the driving condition constant balanced speed which it represents, can in reality never be obtained and, therefore, the diagram does not show realistic circumstances. In the diagram the full line is the tractive effort/speed graph for an SRM DS two-speed preselected mechanical gearbox and the dashed line is the tractive effort/speed graph for an eight-step mechanical gear box the gear steps being indicated as $P_I...P_{VIII}$.

Figure 6:
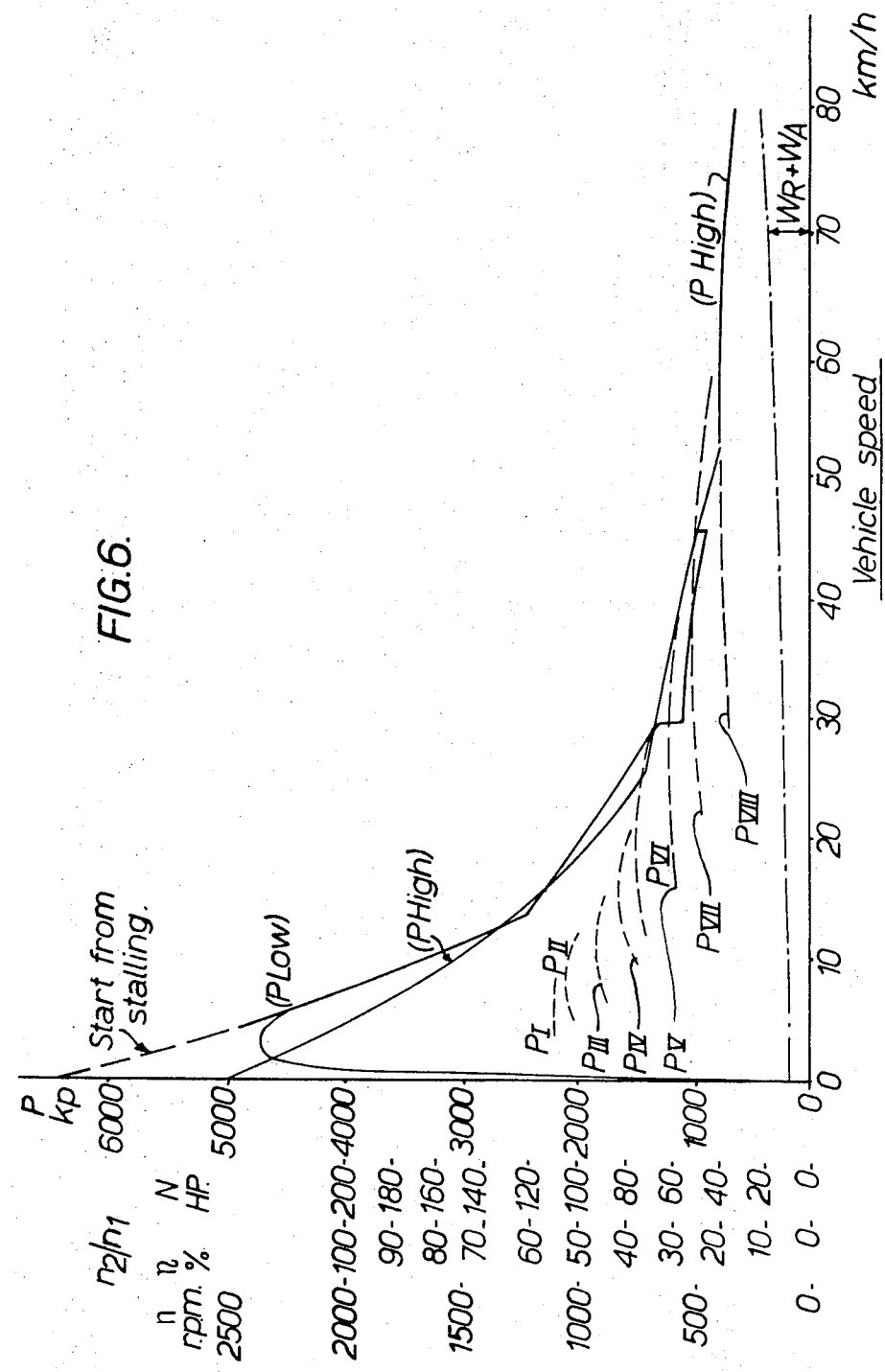
FIG. 6 shows the tractive effort conditions under acceleration conditions.

To indicate the circumstances which actually exist, FIG. 6 shows, for the same vehicle, and two types of transmission (mechanical and automatic) the tractive effort available with the vehicle fully laden and under acceleration on level road. In FIG. 6, the full line and dashed line represent the same graphs as in FIG. 5. The tractive effort available with a gear transmission due to is a problems of the engine as well as necessary acceleration of the engine are lower than that shown in FIG. 5. Of course, on hills, this lower tractive effort with a mechanical transmission becomes less and less the higher the gradient. On the other hand the tractive effort for the hydrodynamic transmission will be higher under all existing circumstances, thereby, giving a higher speed for a particular gradient than is the case with a mechanical transmission. Users of hydromechanical transmissions, that is a combination of one hydrodynamic transmission and a number of power shift gear steps can verify these observations from practical tests. When, however, the question concerns the high speed field, the acceleration in itself has little influence upon tractive effort for both transmissions. Therefore, in the high speed range both transmissions are comparable. Also, a normal gear shift results in a very small loss in time and speed and gives no difficulties in relation to the rest of the traffic. Therefore, a gearshift of the synchromesh type in the high speed range, especially when automatically governed, is readily acceptable.

Diagrams 4, 5 and 6 demonstrate that the transmission according to the invention possesses adaptability and, when correctly adapted, provides better fuel consumption and maneuverability, higher acceleration and speeds on gradients in the low speed range and is directly comparable with a mechanical transmission in the high speed range as far as the tractive effort is concerned. The following description shows how the fuel saving can be obtained with a transmission according to the invention but not with the combination of a torque converter with a multiple power shift transmission covering the same range. The reason for this is shown in the Table.

The Table shows approximate speed responsible losses in different ranges for the arrangement according to FIG. 1 and FIG. 2, and the speed responsible losses in different gears for a transmission of the type having a hydrodynamic torque converter combined with a four-speed power shift planet gear transmission covering the same range as the arrangements of FIGS. 1 and 2. Although these losses do not seem very important since a few percent does not appear to be a sound basis for the selection of one transmission arrangement in relation to another, this is not the full picture. The type of losses now under consideration are shown in the part of the Table for full load conditions, however, for the type of vehicle in question, the average load factor varies between 15 percent to 35 percent for different kinds of service, types of vehicles, etc. This means that the given losses are to be multiplied by a conversion of this factor, for instance, for an average load factor of 20 percent, the factors given in the first part of the Table are to be multiplied by five, and such FIGS. are shown in the second part of the Table. From these factors it can be seen that the fuel consumption for combination 2 will be only about 1 percent higher than for combination 1 as the vehicle will only be driven 20 percent of the time in the low range, but that the fuel consumption for combination 3 will be about 20 percent higher than the fuel consumption for the same service or work for either of the first two combinations. A 20 percent saving of the fuel consumption is equivalent to about the cost of the transmission during the life of the transmission, or even greater dependent on fuel costs and fuel tax. The combination according to 1 or 2 gives fuel saving in relation to the mechanical transmission, which on 30-ton tankers with about 200 HP engines has accounted for one-eighth of the transmission cost per year, and this difference is sufficient in a 3-year to pay the difference in price between the mechanical transmission and the type of transmission in question. These factors are mentioned to indicate the importance of the present solution in relation to solutions of hydromechanical transmissions currently available. A further explanation of how these differences in speed and losses could be obtained is seen in the fact that the whole unit, except the layshaft gear in its high range for the combinations 1 and 2, is rotating as one single unit, while the combination 3 in the high range the number of parts with high relative movement is considerable. What may seem a simple combination thus gives a completely unexpected result which can be measured directly in the saving of money and in future possibilities for the solution. The comparisons between the results of the transmission of the present invention and the results of known transmission proves that the possibility of such a result is unexpected. In fact, the two transmissions according to the invention are the first fully automatic high torque ratio transmissions which result in fuel saving when compared with known mechanical transmission.

Moreover, the fuel consumption saving with the transmission combinations 1 and 2 with a suitable total gear ratio for the purpose required will give about 10 percent fuel saving in relation to the mechanical transmission, whereas the transmission according to combination 3 will result in about 10 percent increase in fuel consumption.

Hitherto it has been common practice to use mechanical transmissions on heavy vehicles. Generally speaking the use of automatic transmissions is at present restricted to vehicles such as buses in high density traffic. However, the rapid increase in traffic density now requires better maneuverability of the vehicles. To this end the ratio paperweight for a certain top speed of the vehicle has been increased by increasing the size of the engines. Increased engine sizes have also resulted in an increase in the average speed and an increased acceleration. In some countries the demand for a fully automatic transmission is considered to be urgently required but practical road tests using currently available units have not proved to be acceptable. One reason for the currently available units not proving acceptable is that they have resulted in a substantial increase in fuel consumption when compared with vehicles fitted with mechanical transmissions carrying the same average load and being driven at the same average speed. Further currently available automatic transmissions contain an extremely high number of components exposed to wear thereby increasing servicing cost. Other existing types of transmissions have been semiautomatic and, consequently, although mechanically simpler they do not give the vehicle the desired maneuverability and moreover they still result in high fuel consumption. In addition, these units are heavier than conventional mechanical eight- or 12-speed gearboxes.

The present invention solves the problem of accomplishing a fully automatic transmission with some overruling possibilities for driving under extreme conditions as well as fulfilling the requirements of reducing fuel consumption in relation to that obtained with a mechanical transmission. Hitherto it has not been considered possible to develop an automatic transmission which would result in a reduced fuel consumption but this is accomplished using a transmission according to the invention. Further, the transmission of the invention is readily acceptable to satisfy the performance requirements of different types of heavy vehicles according to the conditions in which the vehicles will be required to operate. A transmission of the invention is lighter in weight than known mechanical transmissions and known automatic transmissions. The number of components exposed to wear in the transmission of the invention is also reduced to a low number which results in a saving in service cost.

It will be appreciated that when the above requirements are fulfilled together and the overall cost is favorable a successful automatic transmission including a hydrodynamic torque converter for heavy vehicles (such as heavy trucks and lorries) is created. The hydraulic torque converter offer all the advantages associated with such transmissions, for example, saving the vehicle brakes by using hydraulic braking, increased average speed etc. For a 250-horsepower unit, a mechanical transmission having an eight-speed gearbox weights 440 kilograms whereas a transmission according to the invention weights 305 kilograms. Further tests carried out on 3/40-ton oil tankers using mechanical transmissions and transmissions according to the invention under the same operating conditions have shown that the fuel saving obtained is of the order of 10 percent a year of the total cost of the transmission unit.

disconnect the output of the torque converter to the input of the synchromesh transmission; whereby the combination is effective to increase the torque multiplication range of the vehicle transmission by permitting operation of the torque converter over its torque range, as multiplied by the power shift arrangement, for each step of the synchromesh gear transmission.

2. A vehicle transmission according to claim 1, wherein each gear step of the synchromesh transmission has a gear ratio of at least 1.5 that of the preceding gear.

3. A vehicle transmission according to claim 1, including a lockup clutch to provide a direct connection between the input and output of said torque converter.

4. A vehicle transmission according to claim 1, wherein the power shift arrangement includes a planetary gear arrangement operatively connected to the rows of guide vanes and turbine vanes to provide high torque conversion in the low speed range of the torque converter.

5. A vehicle transmission according to claim 1, wherein said row of turbine vanes are fixed to the torque converter output such that during each gear step of the synchromesh gear transmission, the torque converter output is always connected with the synchromesh gear through the release clutch so that there is no break in the drive line of the vehicle transmission throughout the torque converter torque multiplication range, except when changing between steps of the synchromesh gear transmission.

6. A vehicle transmission according to claim 1, wherein the torque converter is of the double rotation type and in a first range of the power shift arrangement the torque converter guide vanes rotate to act as a turbine, and in a second range of power shift gear means the guide vanes are stationary.

7. A vehicle transmission according to claim 1, in which the power shift arrangement is mounted to be connected and disconnected between the torque converter output and the synchromesh gear through a friction brake for carrying power and increasing torque from the torque converter output to the synchromesh gear transmission, and wherein said release clutch is operable to connect the torque converter output directly to the synchromesh gear transmission and wherein the torque converter output is disconnected from the synchromesh gear when the friction brake and the release clutch are disconnected.

TABLE

| Driving range | Speed responsible losses in percent | | | Influence of speed responsible losses at fuel consumption in percent, at an average load of 80% of full power | | | Relative higher fuel consumption for combination 2 and 3 in percent at comparison with combination 1 | |
|---|---|---|---|---|---|---|---|---|
| | Combination 1 | Combination 2 | Combination 3 | Combination 1 | Combination 2 | Combination 3 | Combination 2 | Combination 3 |
| Low: | | | | | | | | |
| 1st | 3 | 4 | 5 | 15 | 20 | 25 | 5 | 10 |
| 2d | | | 6 | | | 30 | | 15 |
| High: | | | | | | | | |
| 3rd | 2 | 2 | 7 | 10 | 10 | 35 | 0 | 25 |
| 4th | | | 8 | | | 40 | | 30 |

NOTE: Combination 1, see FIGURE 1; Combination 2, see FIGURE 2; Combination 3 consists of a hydraulic torque converter with lock up clutch combined with a 4 speed planetary gear power shift; The combination 2 has 2.5% higher average fuel consumption than combination 1; The combination 3 has at least 20% higher average fuel consumption than combination 1.

I claim:

1. A vehicle transmission comprising, in combination:
a hydrodynamic torque converter having at least four rows of vanes including at least a row of pump vanes, a row of guide vanes and a row of turbine vanes;
a nonmeshing, friction engaging power shift arrangement; a release clutch; and a synchromesh transmission having a minimum of two and a maximum of three gear steps;
said power shift arrangement being operatively connected to the said torque converter such that engagement and disengagement of the friction engaging parts of the power shift arrangement provides an increase in the torque multiplication range of the torque converter; said release clutch being positioned to operatively connect and 8. A vehicle transmission according to claim 1, wherein the synchromesh gear transmission includes a reverse gear.

9. A vehicle transmission according to claim 1, wherein the torque converter includes a lockup clutch.

10. A vehicle transmission according to claim 9, wherein the torque converter, the power shift arrangement and the release clutch are rotatable as a unit when the lockup clutch is engaged, thereby providing a direct connection between the torque converter and the transmission output and reducing fuel consumption by limiting losses in the transmission due to the speed thereof.

11. A vehicle transmission according to claim 10, including means for releasing the lockup clutch when connection between the torque converter output and the synchromesh gear transmission is broken.

12. A transmission according to claim 1 wherein the torque converter output includes a turbine shaft, and including a centrifugal regulator for initiating shifting of the synchromesh gear transmission, said centrifugal regulator being driven by the output shaft of the synchromesh gear transmission and being operable to select low gear below a certain speed and a high gear above a certain speed and including means for disconnecting the turbine shaft of the torque converter from the synchromesh gear transmission before the shift takes place and for reconnecting the gear to the torque converter after the shift has taken place.

13. A transmission according to claim 12 including means for selecting the said high or low gears independently of the centrifugal regulator.

14. A transmission according to claim 12 including means for manually applying a signal to maintain connection in a gear.

15. A transmission according to claim 12 including a control valve for controlling connection and disconnection of said release clutch, the first manual selection valve for selecting any one of forward gear, reverse gear or neutral, a forward high/low gear selection valve, a servomotor for shifting the synchromesh transmission, fluid connections from said first manual selection valve to the high, low and reverse positions on the said servomotor, and a first valve in each fluid connection for selectively controlling operation of the said control valve, a restricted valve in each of said fluid connections restricting flow in one direction and permitting flow in a less restricted manner in the opposite direction, whereby the friction coupling means is disconnected before the servomotor is energized and is maintained disconnected until the gearshift is effected.

16. A transmission according to claim 15, including a three-way valve for selectively maintaining the control valve disconnected from neutral, forward or reverse lines when the first manual selection valve is set for disconnection.

17. A transmission according to claim 15 in which the forward high/low gear selection valve is operated by signal received from a second manual selection valve for selecting forward high or forward low gear.

18. A transmission according to claim 17 in which the second manual selection valve includes a position for selecting automatic operation, in which position connection is made to the said centrifugal regulator.

19. A transmission according to claim 15 wherein the said first valves in the fluid connection to high, low and reverse positions of the servomotor, include a first position in which fuel pressure is conveyed to the control valve, the control valve being maintained in the first position when fluid pressure on the primary side of said further valve reaches a predetermined higher pressure than that in the servomotor, and a second position for venting the servomotor either when the pressure in the servomotor has reached a certain pressure or when the pressure on the primary side of said further value is released.

20. A transmission according to claim 19 including a three-way valve between the neutral and reverse positions of the servomotor allowing neutral to be engaged from the reverse position.

21. A transmission according to claim 1 wherein the power shift means comprises a two-speed gear transmission having a high gear and a low gear for multiplying the torque conversion of the torque converter, and wherein the connection between the primary and the secondary side of the power shift gear means is broken when the said high or low gear of the power shift gear means is not directly engaged.

22. A transmission according to claim 21 including a centrifugal regulator on the output shaft of the two-speed power shift gear for automatically controlling the two-speed power shift transmission gear.

23. A vehicle transmission according to claim 1 wherein two of said rows of vanes are turbine vanes, one of said rows of turbine vanes being arranged to deliver fluid to the inlet of the pump vanes.